(12) United States Patent
Li et al.

(10) Patent No.: US 8,594,176 B2
(45) Date of Patent: Nov. 26, 2013

(54) STREAMING MEDIA CODEC WITH TRANSFORM COEFFICIENT BOUNDING

(75) Inventors: Jiang Li, Beijing (CN); Hua Cai, Kowloon (CN)

(73) Assignee: Microsoft Corporation, Redmond, WA (US)

( * ) Notice: Subject to any disclaimer, the term of this patent is extended or adjusted under 35 U.S.C. 154(b) by 1729 days.

(21) Appl. No.: 11/682,684

(22) Filed: Mar. 6, 2007

(65) Prior Publication Data

US 2008/0219345 A1 Sep. 11, 2008

(51) Int. Cl.
*G06K 9/40* (2006.01)
*G06T 9/00* (2006.01)
*H04N 7/30* (2006.01)

(52) U.S. Cl.
USPC ............................ 375/240; 382/254; 382/276

(58) Field of Classification Search
USPC ......................................................... 375/240
See application file for complete search history.

(56) References Cited

U.S. PATENT DOCUMENTS

| | | | | |
|---|---|---|---|---|
| 5,416,854 | A * | 5/1995 | Fukuda et al. | 382/232 |
| 5,590,222 | A * | 12/1996 | Kojima | 382/268 |
| 5,793,314 | A * | 8/1998 | Auyeung | 341/51 |
| 5,862,262 | A * | 1/1999 | Jacobs et al. | 382/249 |
| 5,870,144 | A * | 2/1999 | Guerrera | 375/240.2 |
| 5,872,866 | A * | 2/1999 | Strongin et al. | 382/233 |
| 6,122,318 | A * | 9/2000 | Yamaguchi et al. | 375/240 |
| 6,788,740 | B1 * | 9/2004 | van der Schaar et al. | 375/240 |
| 7,321,622 | B2 * | 1/2008 | Etoh et al. | 375/240 |
| 7,327,786 | B2 * | 2/2008 | Winger et al. | 375/240.12 |
| 2002/0186888 | A1 * | 12/2002 | Kondo et al. | 382/233 |
| 2007/0223580 | A1 * | 9/2007 | Ye et al. | 375/240.12 |

OTHER PUBLICATIONS

Cagnazzo, M., et al, 'Region-Oriented Compression of Multispectral Images by Shape-Adaptive Wavelet Transform and SPIHT', 2004, International Conference on Image Processing (ICIP), entire document, http://ieeexplore.ieee.org/stamp/stamp.jsp?tp=&arnumber=1421600.*

"ITU-T Recommedation H.263—Video Coding for Low Bit Rate Communication", International Telecommunication Union, Mar. 1996, 52 pages.

\* cited by examiner

*Primary Examiner* — Christopher Brown
*Assistant Examiner* — Ronald Baum
(74) *Attorney, Agent, or Firm* — Lee & Hayes, PLLC (57) ABSTRACT

A streaming media codec may include a collection of media stream processing modules arranged into a processing graph. One or more of the modules may perform a Fourier-related transform, and a significant fraction of media stream processing may occur post-transform. The media stream may be considered as a sequence of processing blocks, and post-transform processing blocks contain transform coefficients. Such transform coefficients are amenable to classification into processing classes. Some processing classes may require significantly less processing effort than others by post-transform processing modules. Such transform coefficient classes may be efficiently specified, for example, with coefficient bounding rectangles, and the specification provided to one or more post-transform streaming media processing modules to enable the modules to allocate their processing resources more effectively. Streaming media processing modules making effective use of the transform coefficient class information, and streaming media codecs that incorporate them, are called transform coefficient bounding (TCB) enhanced.

17 Claims, 9 Drawing Sheets

STREAMING MEDIA CODEC WITH TRANSFORM COEFFICIENT BOUNDING

BACKGROUND

It has become commonplace to incorporate streaming media, such as streaming audio and streaming video, into a wide variety of computing applications. A typical streaming media protocol trades computer processing resources for communication bandwidth by encoding streaming media signals before transmission across bandwidth limited transmission paths and then decoding afterwards. The processing resources required can become burdensome, particularly for computing devices with a limited power supply, as intensive processing can result in significant power consumption and rapid power budget expenditure. It is desirable to reduce the processing burden of a given streaming media protocol while, at the same time, reducing or minimizing any compromise to the protocol.

Reducing protocol compromise can provide significant advantages, particularly where an installed base of protocol users exists. Some streaming media protocols can be tuned, for example, so that processing burden can be reduced at a cost of increased bandwidth or lower quality streaming media. However, it is desirable to reduce processing burden without requiring such compromises. Different streaming media protocols have different, and sometimes lower, processing requirements. However, it is also desirable to reduce the processing burden of a particular protocol without making it incompatible with previous versions of the protocol. This type of protocol compromise, in particular, can impact the practicality of the protocol and/or limit its adoption by a user community. Further protocol compromises that are desirable to reduce include compromises to media stream characteristics, symmetric aspects of streaming media coder-decoders (codecs), and settled codec architecture in general.

SUMMARY

A streaming media codec may be considered as a collection of media stream processing modules arranged into a processing graph. It is relatively common for one or more of the modules in such a collection to perform a Fourier-related transform such as a discrete cosine transform, and a significant fraction of media stream processing may occur post-transform. The media stream may be considered as a sequence of processing blocks, and, having been processed by a Fourier-related transform module, the processing blocks contain transform coefficients that may eventually be subject to an inverse of the Fourier-related transform. Such transform coefficients are amenable to classification into processing classes. Some processing classes may require significantly less processing effort than others by post-transform processing modules. For example, the class of zero transform coefficients may require less processing than the class of non-zero transform coefficients. Such transform coefficient classes may be efficiently specified, for example, with coefficient bounding rectangles, and the specification provided to one or more post-transform streaming media processing modules to enable the modules to allocate their processing resources more effectively. Streaming media processing modules making effective use of the transform coefficient class information, and streaming media codecs that incorporate them, are called transform coefficient bounding (TCB) enhanced.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

A streaming media codec may be considered as a collection of data stream processing modules that encode and/or decode streaming media, and, in fact, some streaming media codecs have a modular design and implementation that enables particular data stream processing modules to be upgraded or replaced, and/or new data stream processing modules to be added, independent of others in the collection. It is relatively common for such a collection of modules to include one or more modules that perform a Fourier-related transform (i.e., transform modules), as well as one or more modules designed to further process a media stream so transformed (i.e., post-transform modules). A significant fraction of the processing required to encode and/or decode a media stream may be performed by post-transform modules, so that reducing the processing burden of one or more post-transform modules can significantly reduce the processing burden of the associated streaming media codec as a whole.

A transform module typically has an output data stream that may be considered as including one or more sets of transform coefficients (i.e., numbers corresponding to the transform of a portion of an input data stream). In an embodiment of the invention, the contents of a set of transform coefficients (possibly further processed) may be explicitly classified into a plurality of processing classes. Each transform coefficient class may be processed differently by post-transform modules, and, in an embodiment of the invention, one or more of the plurality of transform coefficient classes require less computing resources to be processed by one or more post-transform modules than others of the plurality. Furthermore, each set of transform coefficients may be considered to be arranged in an n-dimensional space, and, in an embodiment of the invention, each transform coefficient class may be efficiently specified with one or more bounding rectangles in that space.

To introduce an illustrative example that will be used throughout this description, a streaming video codec in accordance with an embodiment of the invention may include a transform module implementing a two-dimensional discrete cosine transform (DCT). The transform coefficients of the discrete cosine transform (possibly further processed) may be classified into a plurality of processing classes including a class corresponding to coefficients having value zero (a zero coefficient class) and a class corresponding to coefficients having a non-zero value (a non-zero coefficient class). In an embodiment of the invention, the zero coefficient class requires less processing by some post-transform modules than the non-zero coefficient class. Each set of transform coefficients output by the transform module may be considered as a two-dimensional matrix, and each transform coefficient class may be specified with one or more two-dimensional bounding rectangles. In particular, the non-zero coefficient class may be specified with a single two-dimensional bounding rectangle.

Figure 1:
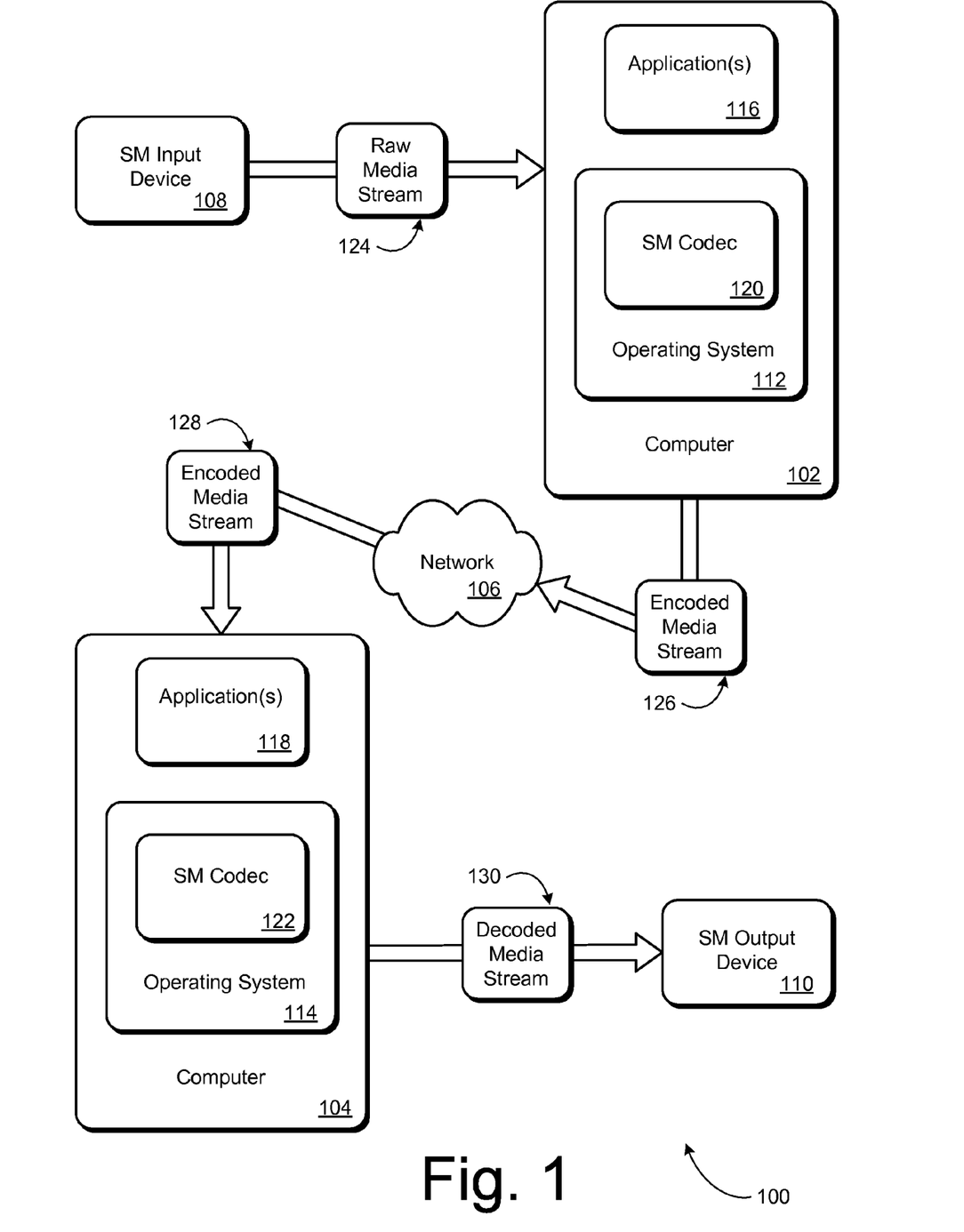
FIG. 1 is a schematic diagram depicting an example computing environment in accordance with an embodiment of the invention.

Before describing embodiments of the invention in more detail, it will be helpful to have reference to illustrative Figures. FIG. 1 depicts an example computing environment 100 suitable for incorporating an embodiment of the invention. The example computing environment includes two computers 102, 104 connected by a network 106. The first computer 102 (also, the encoding computer 102) is connected to, and/or incorporates, a streaming media (SM) input device 108. The second computer 104 (also, the decoding computer 104) is connected to, and/or incorporates, a streaming media (SM) output device 110. Although, for clarity, only two computers 102, 104 are shown in FIG. 1, the computing environment 100 may include a plurality of encoding computers such as the computer 102, as well as a plurality of decoding computers such as the computer 104. Furthermore, as will be apparent to one of skill in the art, the functionality of each computer 102, 104, as well as suitable aspects of network 106 functionality, may be incorporated into a single computer (not depicted in FIG. 1).

Each computer 102, 104 includes an operating system 112, 114, one or more applications 116, 118, and a streaming media (SM) codec 120, 122. In the example computing environment 100 depicted in FIG. 1, the streaming media codec 102, 122 of each computer 102, 104 is incorporated into the operating system 112, 114 of the computer 102, 104. However, each embodiment of the invention is not so limited, for example, one or more of the applications 116, 118 may incorporate a streaming media codec corresponding to the streaming media codec 120, 122. In the example depicted in FIG. 1, both the streaming media codec 120 of the encoding computer 102 and the streaming media codec 122 of the decoding computer 104 are enhanced in accordance with an embodiment of the invention. However, each embodiment of the invention is not so limited. In fact, in an embodiment of the invention, the computing environment 100 is free of a requirement that each computer 102, 104 include a streaming media codec so enhanced. Advantageous enhancement of the streaming media codec 120, 122 in accordance with an embodiment of the invention may occur at one of the encoding computer 102 and the decoding computer 104 independent of the other.

The streaming media input device 108 may provide a raw media stream 124 to the computer 102, that is, a media stream in a format native to the streaming media input device 108. The computer 102 may encode the raw media stream 124 to produce an encoded media stream 126. In an embodiment of the invention, the raw media stream 124 is encoded by the streaming media codec 120. The encoded media stream 126 may be streamed (i.e., communicated) to the computer 104 through the network 106. FIG. 1 depicts an encoded media stream 128 being input to the computer 104 as distinct from the encoded media stream 126 output from the computer 102 to allow for a possibility that the encoded media stream 126 is modified by some element of the network 106. The computer 104 may decode the encoded media stream 128 to produce a decoded media stream 130 suitable for consumption by the streaming media output device 110. In an embodiment of the invention, the encoded media stream 128 is decoded by the streaming media codec 122.

The computers 102, 104 may be any suitable computing device. Examples of suitable computing devices include portable computers, laptop computers, tablet computers, personal digital assistants (PDAs), mobile telephones, programmable consumer electronics devices, mainframes, servers, minicomputers, desktop computers, personal computers (PCs), workstations, routers, gateways, switches, hubs, and suitable combinations thereof. The computers 102, 104 may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language.

The computers 102, 104 may include a wide variety of input/output (I/O) devices not shown in FIG. 1 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by the computers 102, 104 include a tangible computer-readable medium and a communication medium. Tangible computer-readable media may include any one or more of magnetic media (such as hard disks) and optical media such as compact disks (CDs). Communication media may include any one or more of wired communication media (such as copper wire, coaxial cable and optical fiber) as well as wireless communication media (such as electro-magnetic media including radio, microwave, infra-red and laser light).

For clarity, embodiments of the invention may be described herein with reference to symbolic operations such as those of a computer programming language. Such symbolic operations and any data that they act upon correspond to physical states of components and changes in components of computing devices such as the computers 102, 104 in a manner well understood by one of skill in the art. In an embodiment of the invention, each such operation and its associated data may be fully implemented in hardware.

The network 106 may include any suitable network element and/or communication media. A computing device is an example of a suitable network element. The network 106 may incorporate any suitable network topology. Examples of suitable network topologies include simple point-to-point, star topology and self organizing peer-to-peer topologies. The hollow arrows of FIG. 1 indicate a predominate direction of flow of the media stream in its raw 124, encoded 126, 128 and decoded 130 aspects. However, the flow direction indicated by the arrows does not preclude a counter flow of data, in particular, media stream flow control messages may travel counter to the indicated direction.

To continue the illustrative example introduced above, the streaming media input device 108 may include a video camera, and the raw media stream 124 may include a video data format native to the video camera. The streaming media codec 120 may include a video codec, for example, in accordance with an International Telecommunication Union (ITU) standard such as ITU Recommendation H.263, "Video codec for low bit rate communication", 1996 ("an H.263 standard"). Accordingly, the encoded media stream 126, 128 may include encoded video in accordance with the H.263 standard. The streaming media codec 122 of the decoding computer 104 may include a video codec compatible with the video codec of the encoding computer 102. The streaming media output device 110 may include a video display and the decoded media stream 130 may include video data in a format suitable for the video display. Both the video codec of the encoding computer 102 and the video codec of the decoding computer 102 may be enhanced in accordance with an embodiment of the invention.

Figure 2:
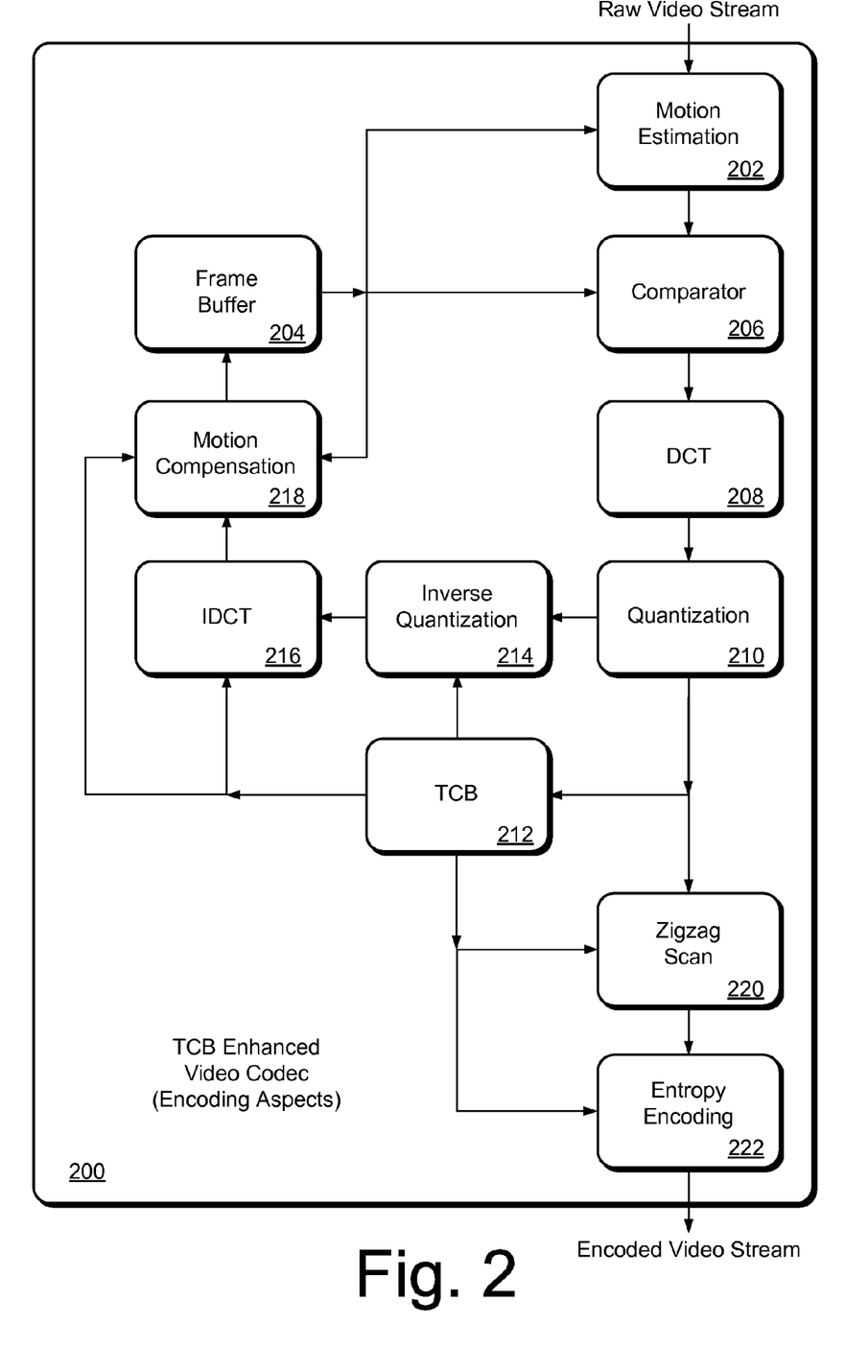
FIG. 2 is a schematic diagram depicting encoding aspects of an example transform coefficient bounding (TCB) enhanced video codec in accordance with an embodiment of the invention.
Figure 3:
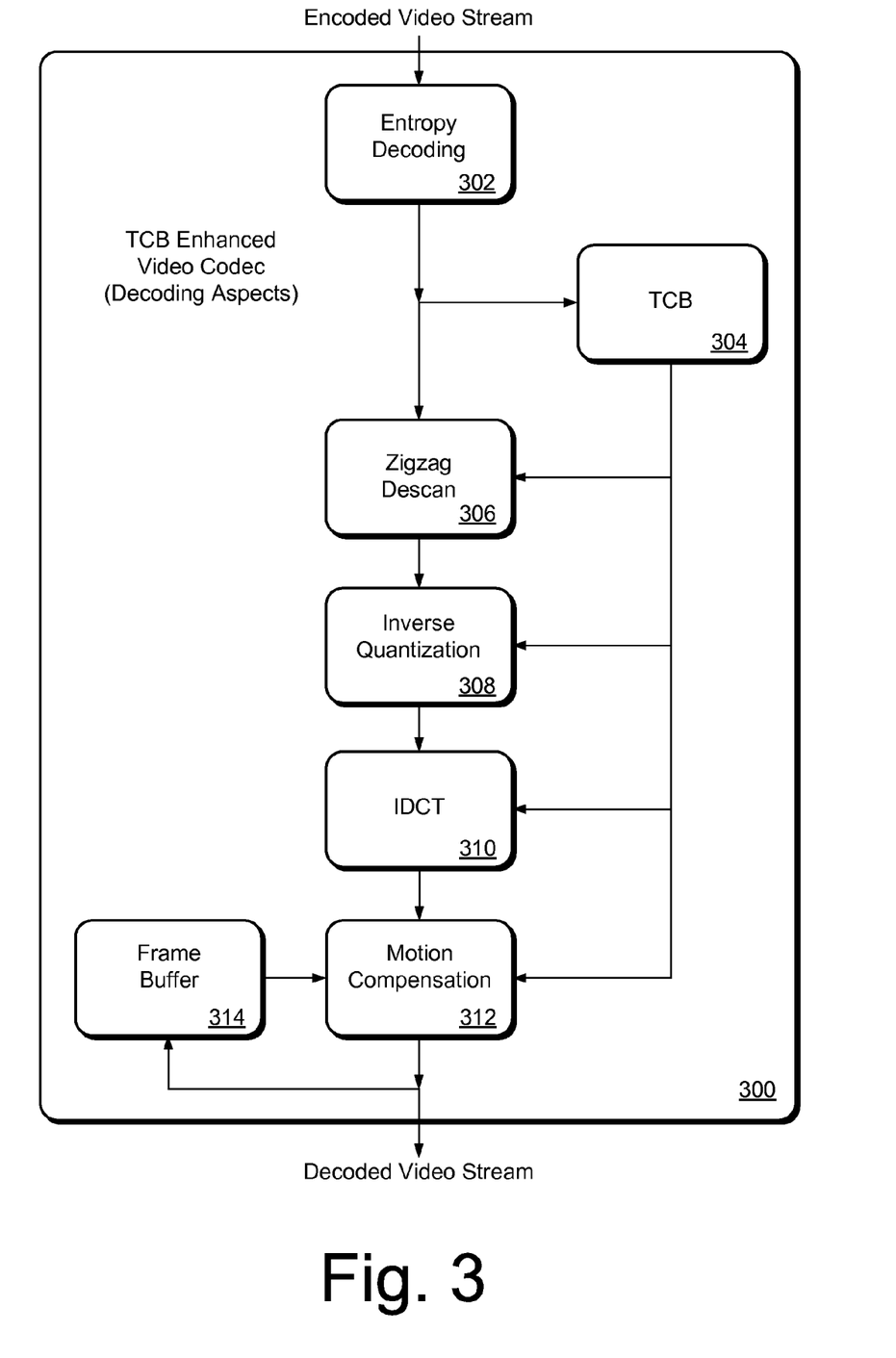
FIG. 3 is a schematic diagram depicting decoding aspects of an example transform coefficient bounding (TCB) enhanced video codec in accordance with an embodiment of the invention.

An example architecture for the streaming media codecs 120, 122 in accordance with an embodiment of the invention is now described in more detail with reference to FIGS. 2 and 3. For clarity, FIGS. 2 and 3 depict architectural details corresponding to the specific video streaming example, however, as will be apparent to one of skill in the art, the example architecture may be adapted for any suitable media stream. FIG. 2 depicts encoding aspects of an example transform coefficient bounding (TCB) enhanced video codec 200 in accordance with an embodiment of the invention. FIG. 3 depicts decoding aspects of the same video codec 300. Different numbers are used herein for encoding and decoding aspects of the video codec (200 and 300, respectively) to further indicate that the video codec 200 and the video codec 300 need not be the same in each embodiment of the invention. The encoding aspects of the video codec 200 are suitable for use by, for example, the streaming media codec 102 of FIG. 1. Similarly, the decoding aspects of the video codec 300 are suitable for use by the streaming media codec 104.

The example video codec 200 of FIG. 2 incorporates a plurality of video stream processing modules including a motion estimation module 202, a frame buffer module 204, a comparator module 206, a discrete cosine transform (DCT) module 208, a quantization module 210, a transform coefficient bounding (TCB) module 212, an inverse quantization module 214, an inverse discrete cosine transform (IDCT) module 216, a motion compensation module 218, a zigzag scan module 218, and an entropy encoding module 222. Several modules 202, 204, 206, 208, 210, 214, 216, 218, 220, 222 may incorporate functionality corresponding to video codec functionality specified by an H.263 standard. Accordingly, such functionality is well understood by those of skill in the art and need not be described here in detail. However, some details will be helpful in describing transform coefficient bounding enhancement in accordance with an embodiment of the invention.

Each module 202, 204, 206, 208, 210, 212, 214, 216, 218, 220, 222 may act as a sink and/or a source for video stream data, beginning, for example, with the motion estimation module 202, which acts as a sink for the raw video stream (e.g., corresponding to the raw media stream 124 of FIG. 1) and as a source for the comparator module 206. The video stream may be considered as a stream, and/or sequence, of video frames. Such frames may be sub-divided into a stream, and/or sequence, of processing blocks. Each module 202, 204, 206, 208, 210, 212, 214, 216, 218, 220, 222 may operate upon one processing block at a time, one video frame at a time, and/or one video stream at a time. Processing block size need not be the same for each module 202, 204, 206, 208, 210, 212, 214, 216, 218, 220, 222.

Consider a moment during video stream encoding. A current video frame was preceded by a previous video frame and will be followed by a next video frame. The frame buffer module 204 may store the previous video frame, and the motion estimation module 202 may perform signal motion estimation based on the current video frame and the previous video frame. The current video frame may then be sent to the comparator module 206. The comparator module 206 may generate a difference video frame based on the current video frame and the previous video frame, and the difference video frame may be sent to the discrete cosine transform module 208. Processing a stream of difference video frames, in contrast to a stream of raw video frames, may reduce processing effort when the raw video stream exhibits modest change from frame to frame.

The discrete cosine transform module 208 may perform a discrete cosine transform on the difference video frame and/or its associated processing blocks to create a transform video frame and/or transformed processing blocks. Any suitable discrete cosine transform may be performed by the discrete cosine transform module 208. The discrete cosine transform is an example of a Fourier-related transform, and thus the discrete cosine transform module 208 is an example of a transform module as described above. The arrows of FIG. 2 connect the modules 202, 204, 206, 208, 210, 212, 214, 216, 218, 220, 222 into a directed graph, and in particular, a stream processing graph. As will be apparent to one of skill in the art, the stream processing graph may be used to determine which of the modules 202, 204, 206, 208, 210, 212, 214, 216, 218, 220, 222 are post-transform modules. Some of the post-transform modules 210, 212, 214, 216, 220, 222 are readily apparent, however the presence of feedback in the stream processing graph (e.g., through the frame buffer module 204) means that each of the modules 202, 204, 206, 208, 210, 212, 214, 216, 218, 220, 222 may be affected by post-transform enhancements in accordance with an embodiment of the invention.

The discrete cosine transform module 208 may send the transform video frame to the quantization module 210. The transform video frame may include one or more sets of transform coefficients. In this example, the transform video frame may include one or more processing blocks of discrete cosine transform coefficients (DCT coefficients). The quantization module 210 may quantize the transform coefficients of the transform video frame. That is, the quantization module 210 may divide the range of transform coefficient values into one or more discrete quanta (i.e., according to a quantization pattern) and substitute a corresponding quantization value for each transform coefficient value. For example, transform coefficients having values between −5 and +5 may be assigned the quantization value 0, values between +6 and +15 may be assigned the quantization value 1, values between +16 and +25 may be assigned the quantization value 2, and so on. The quantization pattern may change over time, for example, in response to changes in a quality of the connection between the encoding computer 102 (FIG. 1) and the decoding computer 104 through the network 106. The quantization module 210 may create a quantized transform video frame having corresponding quantization values in place of transform coefficient values.

The quantization module 210 may pass the quantized transform video frame to the transform coefficient bounding (TCB) module 212. The transform coefficient bounding module 212 may classify the transform coefficients of the quantized transform video frame into one or more processing classes. For example, the transform coefficient bounding module 212 may identify processing classes including a zero coefficient class and a non-zero coefficient class. The transform coefficient bounding module 212 and similar modules may classify the transform coefficients of any suitable streaming media frame and/or processing block. In an embodiment of the invention, the transform coefficient bounding module 212 provides a specification of one or more of the determined processing classes (i.e., a transform coefficient class specification) to one or more post-transform modules.

In an embodiment of the invention, the transform coefficients are such that each of the determined processing classes may be efficiently specified with one or more bounding rectangles. For example, when the quantized transform video frame and/or a processing block thereof is considered as a two dimensional space, array and/or matrix (hereinafter "matrix"), members of a particular determined processing class may form a two dimensional cluster, and a two dimensional bounding rectangle may be determined for the cluster that contains each member of the particular class (i.e., that bounds the cluster). Bounding rectangles may be specified with a number of parameters as low as the dimensionality of the rectangle. For example, a two dimensional bounding rectangle may be specified with as few as two parameters such as length and breadth. The transform coefficient bounding module 212 is described below in more detail with reference to FIGS. 4 and 5.

In the example video codec 200 of FIG. 2, the transform coefficient bounding module 212 provides the specification of the non-zero coefficient class of each quantized transform video frame processing block to each of several post-transform modules 214, 216, 218, 220, 222. As described in more detail below, each of these modules 214, 216, 218, 220, 222 may take advantage of the transform coefficient processing class information to process the associated class of transform coefficients more efficiently, that is, to enhance data stream processing performance. Such modules 214, 216, 218, 220, 222 may be described as transform coefficient bounding (TCB) enhanced. However, an embodiment of the invention need not include each of these modules 214, 216, 218, 220, 222, nor is it limited to these examples, as will be apparent to one of skill in the art. Furthermore, a TCB enhanced video codec such as the video codec 200 may incorporate any suitable combination of TCB enhanced and non-enhanced modules.

In the example video codec 200, the inverse quantization module 214 receives the current quantized transform video frame as one or more processing blocks from the quantization module 210. The inverse quantization module 214 is part of the feedback loop to the comparator module 206. In addition to the quantized transform video frame, the inverse quantization module 214 receives a corresponding set of bounding rectangles from the transform coefficient bounding module 212. For example, the inverse quantization module 214 may receive a bounding rectangle specifying the non-zero coefficient class for each processing block in the current quantized transform video frame.

Each such processing block may have a certain size. For example, each processing block may include 64 quantized transform coefficients (i.e., have a size of 64) corresponding to a square with 8 coefficients per side when considered as a two dimensional matrix. An associated bounding rectangle specifying the non-zero coefficient class for the processing block may have a smaller size. For example, the bounding rectangle may have a height and/or a width less than 8. In an embodiment of the invention, the inverse quantization module 214 performs inverse quantization (e.g., an inverse of the transform performed by the quantization module 210) for those quantized transform coefficients lying within the bounding rectangle. In an embodiment of the invention, when the bounding rectangle has a smaller size than the associated processing block, processing effort by the inverse quantization module 214 is proportionately less. This condition need not hold for each processing block to enable the inverse quantization module 214 to derive advantage from the information provided by the transform coefficient bounding module 212, however, in an embodiment of the invention, it does hold for at least some fraction of the processing blocks in a video frame and/or video data stream. Similar statements with respect to advantage may be made for other TCB enhanced modules.

In an embodiment of the invention, the inverse quantization module 214 produces a newly dequantized transform video frame corresponding to the transform video frame created by the discrete cosine transform module 208, and sends it to the next module in the feedback loop to the comparator module 210, which, in the example video codec 200 of FIG. 2, is the inverse discrete cosine transform module 216. In addition to the newly dequantized transform video frame, the inverse discrete cosine transform module 216 receives a corresponding set of bounding rectangles from the transform coefficient bounding module 212. For example, the inverse discrete cosine transform module 216 may receive a bounding rectangle specifying the non-zero coefficient class for each processing block in the newly dequantized transform video frame.

The inverse discrete cosine transform module 216 may perform an inverse discrete cosine transform upon the processing blocks of the newly dequantized transform video frame, for example, the inverse discrete cosine transform may be an inverse of the transform performed by the discrete cosine transform module 208. In an embodiment of the invention, the inverse discrete cosine transform module 216 performs the inverse discrete cosine transform upon those transform coefficients of a given processing block that lie within its associated bounding rectangle, and, as for the inverse quantization module 214, if the bounding rectangle is smaller in size than its associated processing block then the processing effort required by the inverse discrete cosine transform module 216 is proportionately less. For example, the processing effort may be reduced by a ratio corresponding to a ratio of the bounding rectangle size to the processing block size.

The inverse quantization module 214 and the inverse discrete cosine transform module 216 are examples of TCB enhanced modules that may benefit from coefficient class bounding rectangles having a range of sizes. The zigzag scan module 220, described in more detail below, is another such module. In contrast, some TCB enhanced modules may benefit from coefficient class bounding rectangles having a particular size. For example, some TCB enhanced modules may benefit from a knowledge that the bounding rectangle of a particular transform coefficient class has size zero, that is, that the bounding rectangle, and thus the particular transform coefficient class, is empty (i.e., is an empty transform coefficient class). The motion compensation module 218 and the entropy encoding module 222 are examples of TCB enhanced modules that may benefit from the knowledge that a particular transform coefficient class is empty.

The quantized transform video frame, having been processed by the inverse quantization module 214 and the inverse discrete cosine transform module 216, may be further processed by the motion compensation module 218, for example, to update the frame buffer module 204. In an embodiment of the invention, this further processing is enhanced by the corresponding set of bounding rectangles from the transform coefficient bounding module 212. For example, the motion compensation module 218 may receive a bounding rectangle specifying the non-zero coefficient class for each processing block in the video frame. In an embodiment of the invention, if the bounding rectangle corresponding to a particular processing block is empty, then a corresponding processing block in the frame buffer module 204 need not be updated, that is, the bounding rectangle may act as a switch and/or regulator that disables a corresponding update operation if the bounding rectangle is empty. As an equivalent to disabling an update operation, the motion compensation module 218 may output, unmodified, a corresponding processing block from a previous video frame, that is, unmodified with respect to motion compensation.

Having described TCB enhanced modules on the feedback path to the comparator module 206, the description now returns to the video encoding mainline. In the example video codec 200 of FIG. 2, the quantized transform video frame created by the quantization module 210 is processed by two further modules before being streamed to a compatible video codec such as the streaming media codec 122 of FIG. 1. Those two further modules are the zigzag scan module 220 and the entropy encoding module 222. Each of these two further modules may be enhanced to take advantage of transform coefficient class specifications provided by the transform coefficient bounding module 212.

In addition to the quantized transform video frame, the zigzag scan module 220 may receive a corresponding set of bounding rectangles from the transform coefficient bounding module 212. For example, the zigzag scan module 220 may receive a bounding rectangle specifying the non-zero coefficient class for each processing block in the quantized transform video frame. The zigzag scan module 220 may perform a zigzag scan transform upon each processing block, for example, in accordance with the H.263 standard. In an embodiment of the invention, the zigzag scan module 220 may perform the zigzag scan transform upon the set of quantized transform coefficients of the processing block that lie within the corresponding bounding rectangle. Once again, a reduction in processing effort may be achieved corresponding to the ratio of the size of the bounding rectangle to the size of the associated processing block. In an embodiment of the invention, incorporation of a TCB enhanced zigzag scan such as the zigzag scan performed by the zigzag scan module 220 in a streaming media encoding such as the encoding performed by the video codec 200 requires that a compatible streaming media decoding incorporate a compatible zigzag descan, for example, a TCB enhanced zigzag descan as described in more detail below with reference to FIG. 3.

The result of the zigzag scan transform may be sent to the entropy encoding module 222. In addition, the entropy encoding module 222 may receive a corresponding set of bounding rectangles, for example, the bounding rectangle specifying the non-zero coefficient class for each processing block received form the zigzag scan module 220. The entropy encoding module 222 may increase an entropy of the data stream using data compression techniques well known to those of skill in the art and, for example, in accordance with the H.263 standard.

In an embodiment of the invention, a particular transform coefficient class specification as determined by the transform coefficient bounding module 212 may correspond to one or more output sequences of the entropy encoding module 222, and the entropy encoding module 222 may be configured to output the sequence(s) in response to the transform coefficient class specification. For example, a processing block associated with a bounding rectangle specifying an empty non-zero coefficient class may be encoded with a particular output sequence (i.e., the zero block sequence) and the entropy encoding module 222 may output the zero block sequence in response to the empty bounding rectangle. In an embodiment of the invention, the entropy encoding module 222 may reduce processing effort by outputting the sequence(s) in response to the transform coefficient class specification instead of calculating the sequence(s) from coefficients in the processing block As described above, the output of the entropy encoding module 222, possibly further processed by the video codec 200, (i.e., the encoded video stream) may be streamed to compatible video codecs such as the video codec 300 (FIG. 3), for example, through the network 106 (FIG. 1). The video codec 300 may then decode the encoded video stream. In an embodiment of the invention, the video codec 300 may incorporate TCB enhanced modules that enhance a processing performance of the video codec 300.

The example video codec 300 of FIG. 3 incorporates a plurality of video stream processing modules including an entropy decoding module 302, a transform coefficient bounding (TCB) module 304, a zigzag descan module 306, an inverse quantization module 308, an inverse discrete cosine transform (IDCT) module 310, a motion compensation module 312, and a frame buffer module 314. Each module 302, 304, 306, 308, 310, 312, 314 may correspond to one or more modules described with reference to the video codec 200 (FIG. 2). For example, the entropy decoding module 302 may correspond to the entropy encoding module 222, the transform coefficient bounding module 304 may correspond to the transform coefficient bounding module 212 of FIG. 2, the zigzag descan module 306 may correspond to the zigzag scan module 220, the inverse quantization module 308 may correspond to the inverse quantization module 214 of FIG. 2, the inverse discrete cosine transform module 310 may correspond to the inverse discrete cosine transform module 216 of FIG. 2, the motion compensation module 312 may correspond to the motion compensation module 218 of FIG. 2, and the frame buffer module 314 may correspond to the frame buffer module 204 of FIG. 2. In an embodiment of the invention, each module 302, 304, 306, 308, 310, 312, 314 of FIG. 3 is a duplicate of its corresponding module in the video codec 200 of FIG. 2 (although the module may be configured in a different processing mode), however, each embodiment of the invention is not so limited. The modules of the video codec 200 of FIG. 2 and the video codec 300 of FIG. 3 need only be compatible. The modules 304, 306, 308, 310, 312, 314 of FIG. 3 are arranged in a different processing graph from corresponding modules of FIG. 2 and achieve a different result (i.e., video stream decoding in contrast to video stream encoding), nevertheless statements above with respect to the video codec 200 of FIG. 2 and/or its modules are generally applicable to the video codec 300 of FIG. 3 and/or its modules and need not be repeated below.

The entropy decoding module 302 of the video codec 300 of FIG. 3 may receive the encoded video stream output by the entropy encoding module 222 of the video codec 200 of FIG. 2. The entropy decoding module 302 may decode the encoded video stream, for example, by applying an inverse of one or more encoding operations applied by the entropy encoding module 222, to produce a stream of processed video frames and/or associated processing blocks corresponding to the output of the zigzag scan module 220 of FIG. 2. A copy of the decoded video frames may be sent to each of the transform coefficient bounding module 304 and the zigzag descan module 306.

The transform coefficient bounding module 304 may classify the transform coefficients of the processed video frames and/or associated processing blocks output by the entropy decoding module 302 into one or more processing classes. As described above for the video codec 200 of FIG. 2, the coefficients of the processed video frames and/or associated processing blocks may be considered transform coefficients because they are downstream from the discrete cosine transform module 208 or its equivalent. For example, the transform coefficient bounding module 304 (FIG. 3) may identify processing classes including a zero coefficient class and a non-zero coefficient class. In an embodiment of the invention, the transform coefficient bounding module 304 provides a specification of the one or more determined processing classes (i.e., a transform coefficient class specification) to one or more of the modules of the video codec 300. As for the transform coefficient bounding module 212 of FIG. 2, in an embodiment of the invention, the transform coefficients output by the entropy decoding module 302 are such that each of the determined processing classes may be efficiently specified with one or more bounding rectangles.

In the example video codec 300 of FIG. 3, the transform coefficient bounding module 304 provides the specification of the non-zero coefficient class of each video frame processing block to each of several modules 306, 308, 310, 312. Again, those modules 306, 308, 310, 312 may be considered as post-transform modules because they are downstream from the discrete cosine transform module 208 of FIG. 2. Each of these modules 306, 308, 310, 312 may take advantage of the transform coefficient processing class information to process the associated class of transform coefficients more efficiently, that is, they may be TCB enhanced.

The zigzag descan module 306 may be TCB enhanced in a same or similar manner as the zigzag scan module 220 of FIG. 2. In this example, the input to the zigzag descan module 306 from the entropy decoding module 302 corresponds to the output of the zigzag scan module 220. For each processing block in the input stream, the zigzag descan module 306 may receive a bounding rectangle specifying the non-zero coefficient class from the transform coefficient bounding module 304. The zigzag descan module 306 may perform a zigzag descan transform upon each processing block, for example, in accordance with the H.263 standard. In an embodiment of the invention, the zigzag descan module 306 may perform the zigzag descan transform upon the set of transform coefficients of each processing block that lie within the corresponding bounding rectangle. As for the zigzag scan module 220 (FIG. 2), a reduction in processing effort may be achieved corresponding to the ration of the size of the bounding rectangle to the size of the associated processing block.

Each of the inverse quantization module 308, the inverse discrete cosine transform module 310, and the motion compensation module may be TCB enhanced in a same or similar manner as their corresponding modules in the video codec 200 (FIG. 2). This is true in particular for this example because the modules 308, 310, 312 in the video codec 300 of FIG. 3 and the corresponding modules 214, 216, 218 in the video codec 200 of FIG. 2 are arranged in a similar processing graph, and the output of the zigzag descan module 306 corresponds to the output of the quantization module 210. Of course, the output of the motion compensation module 312 of FIG. 3, possibly further processed by the video codec 300, becomes a decoded video stream corresponding to the decoded media stream 130 of FIG. 1, as well as updating the frame buffer module 314.

Figure 4:
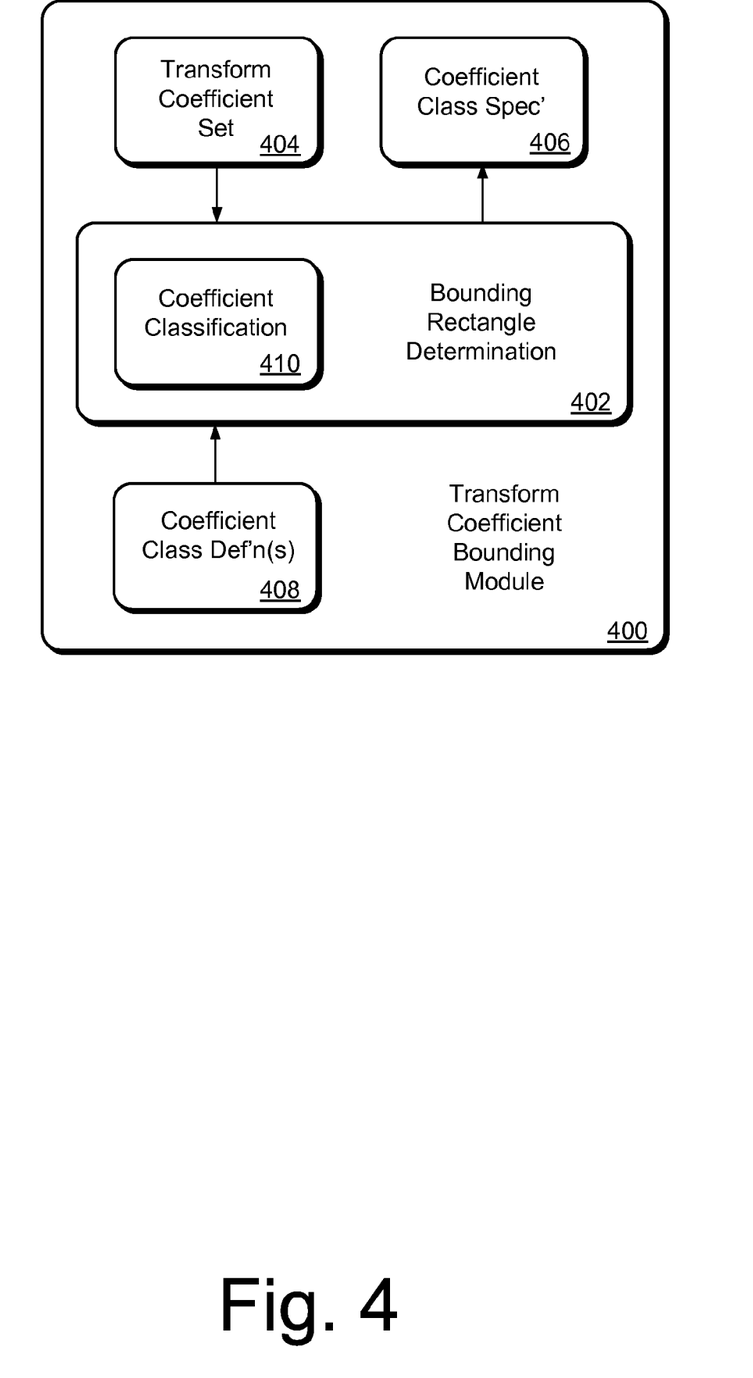
FIG. 4 is a schematic diagram depicting an example transform coefficient bounding (TCB) module in accordance with an embodiment of the invention.

Before proceeding to describe steps that may be performed in accordance with an embodiment of the invention, for example, by the video codec(s) depicted in FIGS. 2 and 3, it will be helpful to describe transform coefficient bounding modules such as the transform coefficient bounding module 210 and the transform coefficient bounding module 304 in more detail. FIG. 4 depicts an example transform coefficient bounding module 400 in accordance with an embodiment of the invention. The transform coefficient bounding module 400 may include a bounding rectangle determination module 402, a transform coefficient set 404, a coefficient class specification 406, and one or more coefficient class definitions 408. The bounding rectangle determination module 402 may include a coefficient classification module 410.

The transform coefficient set 404 may store one or more Fourier-related transform coefficients. For example, the transform coefficient set 404 may include one or more discrete cosine transform coefficients structured as one or more video frames and/or processing blocks thereof. The coefficient classification module 410 may associate one or more transform coefficient classes with each transform coefficient in the transform coefficient set 404, for example, in accordance with the coefficient class definition(s) 408. The coefficient class definition(s) 408 may define a transform coefficient class based on type and/or value. For example, a particular class definition may include transform coefficients having a type belonging to a specified set of types and/or a having a value belonging to a specified range of values. In an embodiment of the invention, the non-zero coefficient class is defined as those transform coefficients having a value different from zero. The coefficient class definition(s) 408 may be incorporated (e.g., "hard coded") into the coefficient classification module 410.

Figure 5:
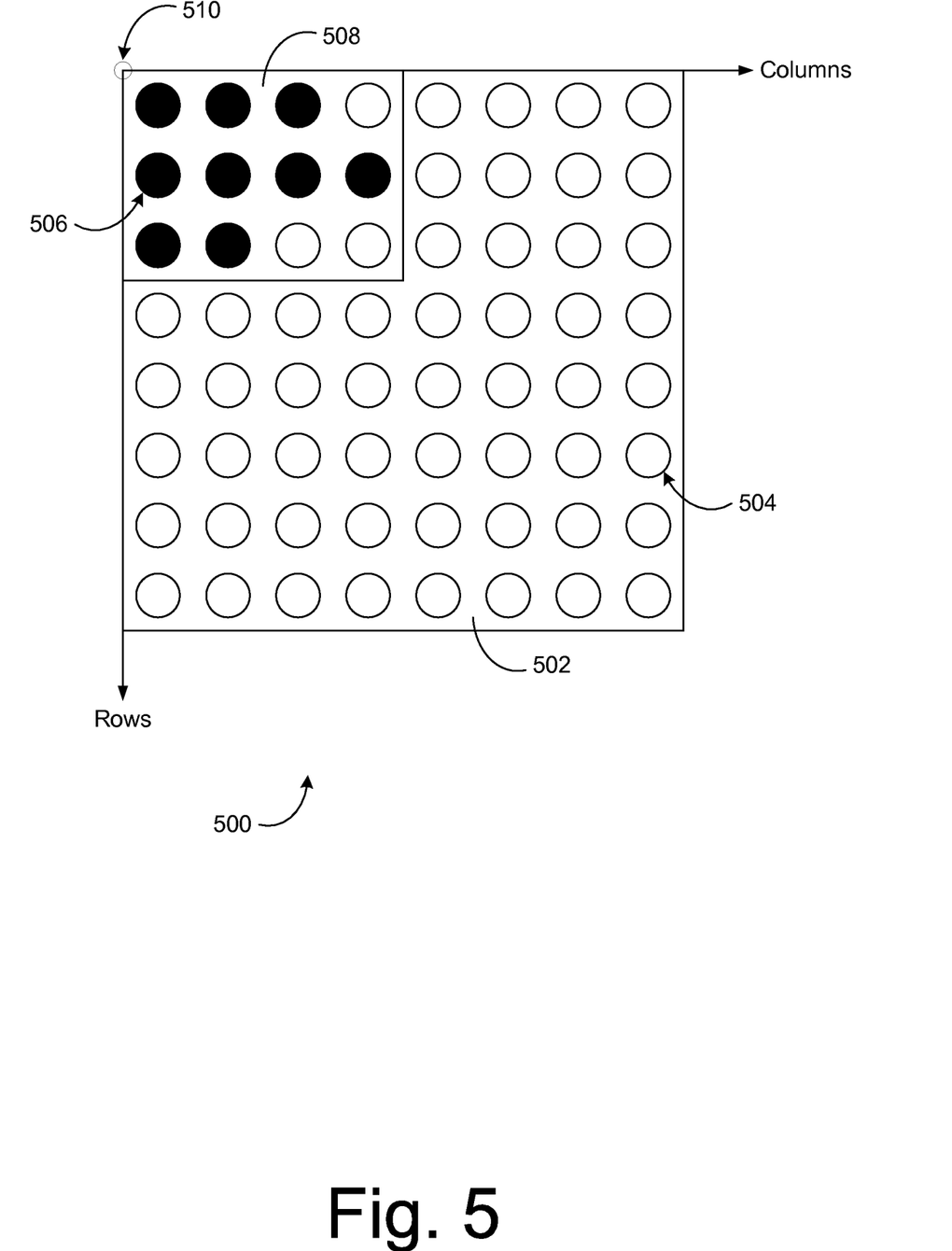
FIG. 5 is a matrix diagram illustrating a bounding rectangle of a transform coefficient class in accordance with an embodiment of the invention.

The bounding rectangle determination module 402 may consider the transform coefficient set 404 (and/or subsets thereof) as one or more two dimensional matrices. For each such matrix and each associated coefficient class, the bounding rectangle determination module 402 may determine a two dimensional rectangle that bounds the members of the coefficient class within the matrix. The bounding rectangle determination module 402 may update the coefficient class specification 406 with the set of bounding rectangles so determined. FIG. 5 illustrates a relationship between coefficient matrices, coefficient classes and bounding rectangles in accordance with an embodiment of the invention.

The circles of FIG. 5 represent a set of Fourier-related transform coefficients 500. For example, the coefficients 500 may be discrete cosine transform coefficients. The coefficients 500 are arranged into a two dimensional matrix 502 having eight rows and eight columns. For example, the coefficient matrix 502 may correspond to a video frame processing block in accordance with the H.263 standard. The coefficients 500 have been classified into two coefficient classes: a first coefficient class represented by unfilled circles such as the circle 504, and a second class represented by filled circles such as the circle 506. For example, the first coefficient class may correspond to transform coefficients having a value of zero (i.e., the zero coefficient class), and the second coefficient class may correspond to transform coefficients having a value differing from zero (i.e., the non-zero coefficient class).

A bounding rectangle 508 has been determined for the second coefficient class. The bounding rectangle 508 is three rows high and four columns wide. The bounding rectangle 508 contains each member of the second coefficient class, that is, the bounding rectangle 508 bounds the second coefficient class. The bounding rectangle 508 also contains members of the first coefficient class. In this example, the origin of the bounding rectangle 508 coincides with the origin 510 of the coefficient matrix 502. In an embodiment of the invention, the bounding rectangle 508 is constrained to have an origin that coincides with the origin 510 of its associated coefficient matrix 502, for example, to decrease and/or minimize a number of parameters required to specify the bounding rectangle. For example, the bounding rectangle 508 may be specified with two parameters having values 3 and 4. However, each embodiment of the invention is not so limited.

Having described structural and data flow aspects of examples in accordance with an embodiment of the invention, it will be helpful to describe aspects of the examples from a procedural point of view. Again, for clarity, the focus is on the video stream processing example.

Figure 6:
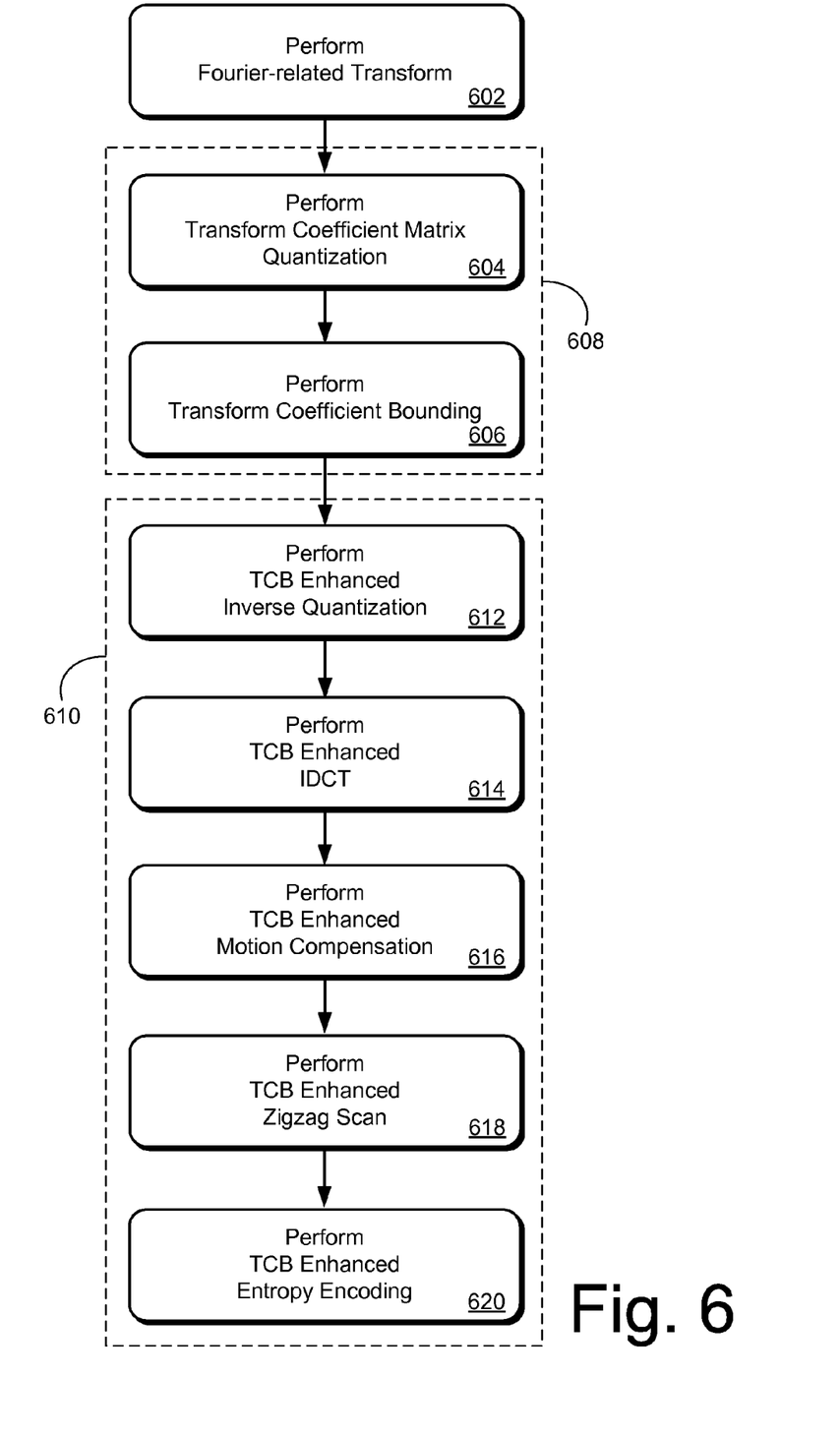
FIG. 6 is a flowchart depicting example steps for TCB enhanced encoding of a media stream in accordance with an embodiment of the invention.

FIG. 6 depicts example steps that may be performed as a part of encoding by a streaming media codec such as the video codec 200 (FIG. 2) in accordance with an embodiment of the invention. At step 602, a Fourier-related transform may be performed, for example, the discrete cosine transform module 208 of the video codec 200 may perform a discrete cosine transform. In an embodiment of the invention, a result of the Fourier-related transform is the creation of a transform coefficient matrix such as the matrix 502 of FIG. 5. At step 604, a quantization of the transform coefficient matrix may be performed. For example, the quantization module 210 of the video codec 200 may quantize an 8×8 processing block of a transform video frame output by the discrete cosine transform module 208.

At step 606 (FIG. 6), transform coefficient bounding (TCB) may be performed. For example, transform coefficient bounding may be performed with respect to the transform coefficient matrix quantized at step 604. Example steps for performing transform coefficient bounding in accordance with an embodiment of the invention are described below with reference to FIG. 8. The transform coefficient bounding may be based, at least in part, on transform coefficient values, and the quantization of step 604 may have a significant effect on transform coefficient values. As a result, the quantization step 604 may be considered as integral to the transform coefficient bounding step 606. This is indicated in FIG. 6 with the dashed line 608.

The transform coefficient bounding step 606 may produce a transform coefficient class specification corresponding to the transform coefficient matrix. The transform coefficient class specification may be utilized, as described above, to enhance the processing performance of one or more subsequent transform coefficient matrix processing steps 610. Such processing steps may be described as TCB enhanced. In FIG. 6, the TCB enhanced processing steps 610 include inverse quantization (step 612), inverse discrete cosine transform (step 614), motion compensation (step 616), zigzag scan (step 618) and entropy encoding (step 620). However, each embodiment of the invention is not so limited. Example steps for performing TCB enhanced motion compensation and entropy encoding in accordance with an embodiment of the invention are described below with reference to FIGS. 9 and 10 respectively.

Figure 7:
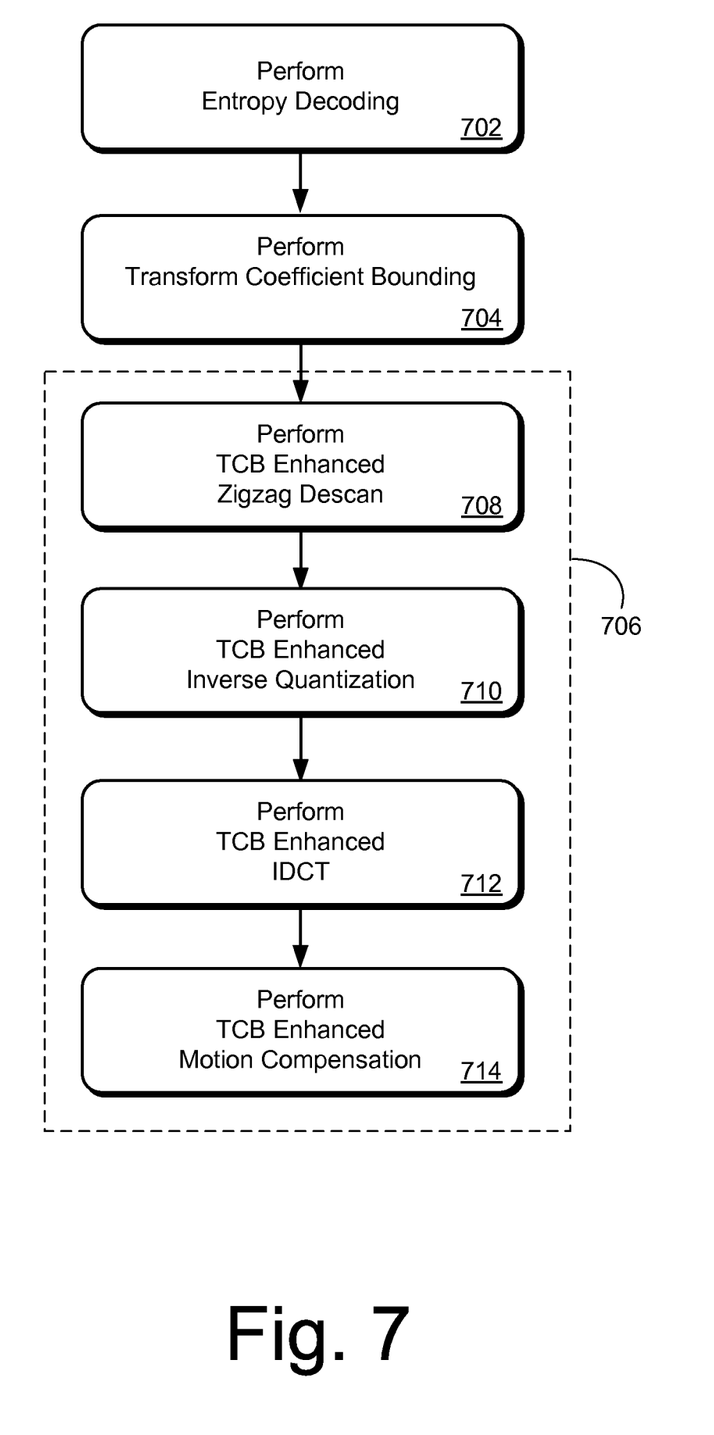
FIG. 7 is a flowchart depicting example steps for TCB enhanced decoding of a media stream in accordance with an embodiment of the invention.

FIG. 7 depicts example steps that may be performed as a part of decoding by a streaming media codec such as the video codec 300 (FIG. 3) in accordance with an embodiment of the invention. In an embodiment of the invention, a result of the TCB enhanced entropy encoding step 620 of FIG. 6 is an encoded bit stream corresponding to the transform coefficient matrix created at step 602 and further processed by the quantization step 604 and the TCB enhanced zigzag scan step 618. At step 702, the encoded bit stream may be decoded, for example, by the entropy decoding module 302, to recreate the processed transform coefficient matrix.

At step 704, transform coefficient bounding (TCB) may be performed. For example, transform coefficient bounding may be performed with respect to the processed transform coefficient matrix recreated at step 702. In an embodiment of the invention, although the input matrices are different, the transform coefficient bounding step 704 is similar to the transform coefficient bounding step 606 (FIG. 6). For example, the steps described below with reference to FIG. 8 are suitable for performing the transform coefficient bounding step 704.

Figure 9:
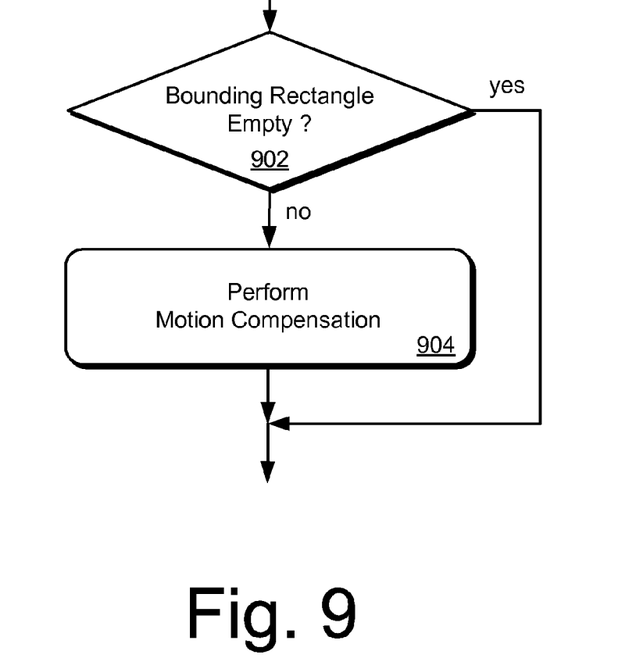
FIG. 9 is a flowchart depicting example steps for performing TCB enhanced motion compensation in accordance with an embodiment of the invention.

As with step 606 (FIG. 6), the transform coefficient bounding step 704 (FIG. 7) may produce a transform coefficient class specification to enable one or more TCB enhanced matrix processing steps 706. In FIG. 7, the TCB enhanced processing steps 706 include zigzag descan (step 708), inverse quantization (step 710), inverse discrete cosine transform (step 712) and motion compensation (step 714). The zigzag descan step 708 may be considered an inverse of the zigzag scan step 618, and the inverse quantization, inverse discrete cosine transform and motion compensation steps 710, 712, 714 may correspond to the like-named steps 612, 614, 616 of FIG. 6. For example, the steps described below with reference to FIG. 9 are suitable for performing the TCB enhanced motion compensation step 714.

Figure 8:
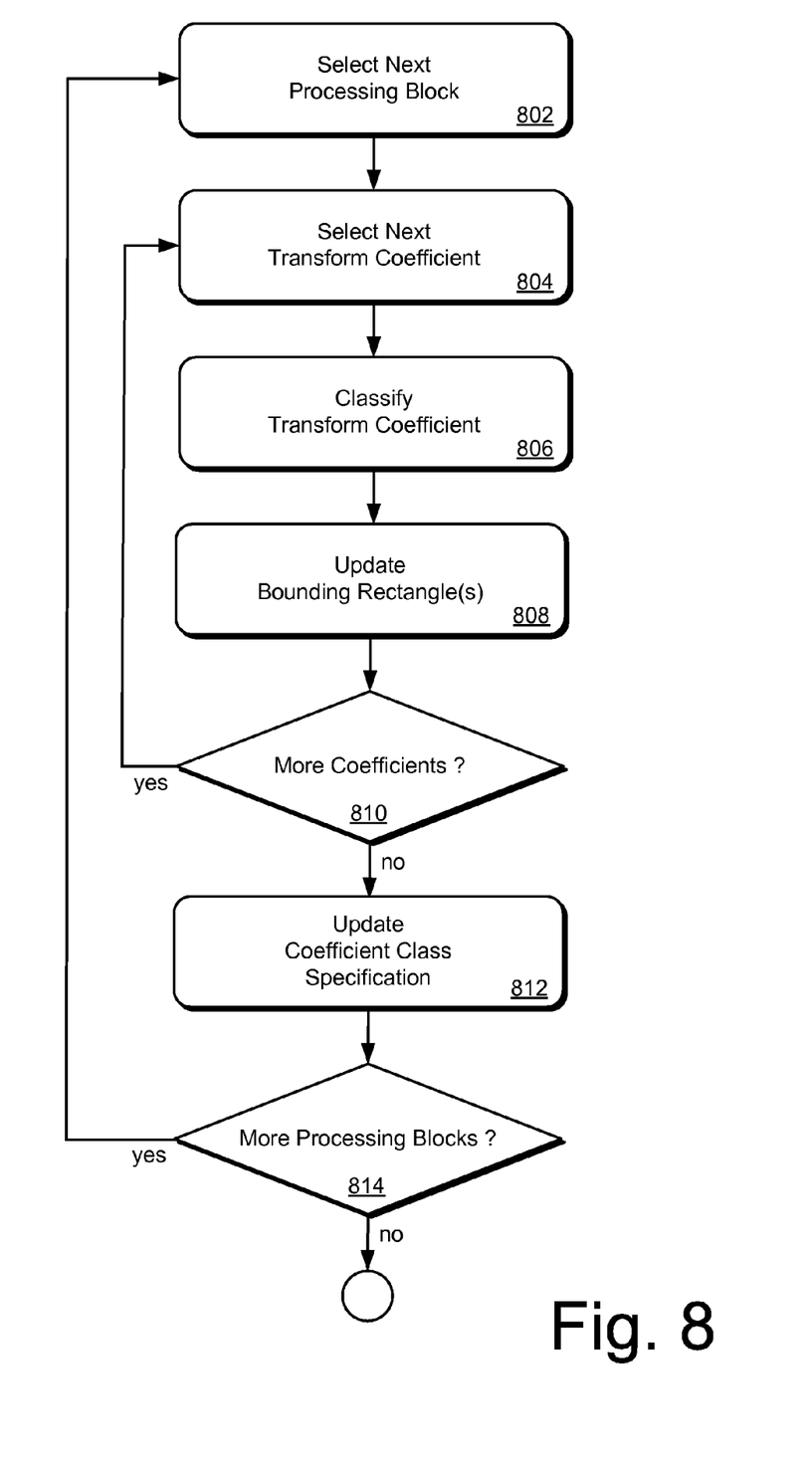
FIG. 8 is a flowchart depicting example steps for performing transform coefficient bounding in accordance with an embodiment of the invention.

FIG. 8 depicts example steps for performing transform coefficient bounding in accordance with an embodiment of the invention. For example, the steps of FIG. 8 may be performed by the transform coefficient bounding module 400 of FIG. 4. At step 802, a next processing block may be referenced. For example, the bounding rectangle determination module 402 may reference the next processing block in the transform coefficient set 404. The transform coefficient matrix 502 (FIG. 5) is an example of a processing block that may be referenced at step 802.

At step 804 (FIG. 8), a next transform coefficient may be referenced. For example, the coefficient classification module 410 (FIG. 4) may reference one of the transform coefficients in the processing block referenced at step 802. At step 806, the referenced transform coefficient may be classified. For example, the coefficient classification module 410 may associate the referenced transform coefficient with one or more classes in accordance with the coefficient class definition(s) 408.

Each transform coefficient class may be associated with one or more bounding rectangles. For example, the transform coefficient class represented by the filled circles such as the filled circle 506 in FIG. 5 is associated with the bounding rectangle 508. At step 808 (FIG. 8), the bounding rectangle(s) associated with each transform coefficient class may be updated to bound any new class members discovered at step 806. For example, if it were discovered at step 806 that the transform coefficient represented by the circle 504 belonged to the coefficient class represented by the filled circles such as the circle 506, then at step 808, the bounding rectangle 508 may be updated to include the newly discovered class member, that is, the bounding rectangle 508 may be expanded to six rows high and eight columns wide.

At step 810 (FIG. 8), it may be determined if there are more transform coefficients in the referenced processing block to classify. If there are more transform coefficients to classify, a procedure incorporating the steps of FIG. 8 may return to step 804. Otherwise, the procedure may progress to step 812. At step 812, a coefficient class specification associated with the referenced processing block may be updated. For example, the bounding rectangle determination module 402 (FIG. 4) may update the class coefficient specification 406 with the bounding rectangle(s) as updated by step 808. At step 814, it may be determined if there are more processing blocks to process. For example, the bounding rectangle determination module 402 may determine if there are unprocessed processing blocks in the transform coefficient set 404. If there are more processing blocks to process, the procedure may return to step 802. Otherwise, the procedure may progress, for example, to step 612 of FIG. 6 or step 708 of FIG. 7.

FIG. 9 depicts example steps for performing TCB enhanced motion compensation in accordance with an embodiment of the invention. For example, the steps of FIG. 9 may be performed by the motion compensation module 218 of FIG. 2 or the motion compensation module 312 of FIG. 3. In this example, each processing block is associated with a bounding rectangle specifying the non-zero coefficient class of the processing block. At step 902, it may be determined if the bounding rectangle associated with the current processing block is empty. For example, it may be determined that both the height and the width of the bounding rectangle are zero. If the bounding rectangle is not empty, a procedure incorporating the steps of FIG. 9 may progress to step 904. At step 904, motion compensation may be performed with respect to the processing block, for example, in accordance with the H.263 standard. If the bounding rectangle is empty, then the processing effort associated with step 904 may be avoided.

Figure 10:
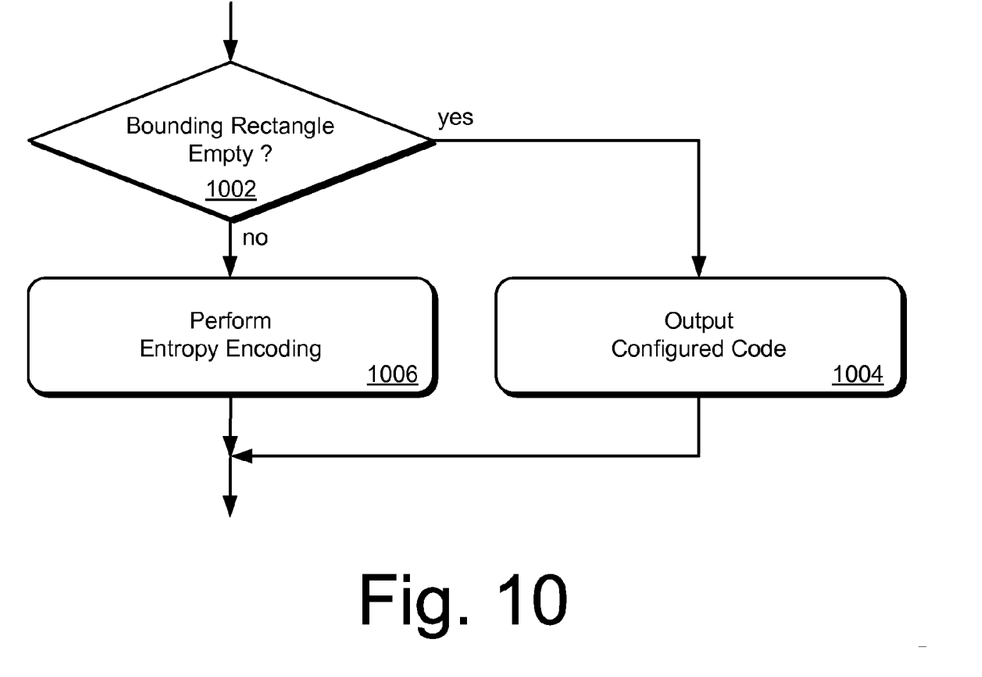
FIG. 10 is a flowchart depicting example steps for performing TCB enhanced entropy encoding in accordance with an embodiment of the invention.

FIG. 10 depicts example steps for performing TCB enhanced entropy encoding in accordance with an embodiment of the invention. For example, the steps of FIG. 10 may be performed by the entropy encoding module 222 of FIG. 2. In this example, each processing block is associated with a bounding rectangle specifying the non-zero coefficient class of the processing block. As for step 902 (FIG. 9), at step 1002, it may be determined if the bounding rectangle associated with the current processing block is empty. If the bounding rectangle is empty, the a procedure incorporating the steps of FIG. 10 may progress to step 1004. Otherwise, the procedure may progress to step 1006. At step 1006, entropy coding of the processing block may be performed, for example, in accordance with the H.263 standard. At step 1004, the processing effort associated with step 1006 may be avoided by outputting a configured code corresponding to the empty bounding rectangle condition. For example, the configured code may correspond to the code that would be output by step 1006 if it were to process a processing block having an empty non-zero coefficient class.

The invention claimed is:

1. A computer-implemented system for streaming media processing, the system comprising:
   memory;
   at least one processor for executing modules stored in the memory, the modules including:
      a transform module configured to, at least, perform a Fourier-related transform on a processing block of a media stream, the transformed processing block comprising a plurality of transform coefficients;
      a transform coefficient bounding module configured to: determine a transform coefficient class specification specifying at least one transform coefficient class among a set of transform coefficients corresponding to the plurality of transform coefficients, wherein:
         the transform coefficient class specification includes at least one bounding rectangle specification, the at least one bounding rectangle specification being determined based on a cluster of non-zero valued transform coefficients of the set of transform coefficients and including a specification of a bounding rectangle that bounds the cluster; and
         the at least one transform coefficient class comprises the non-zero valued transform coefficients of the set of transform coefficients being bounded inside the bounding rectangle and zero valued transform coefficients of the set of transform coefficients being outside of the bounding rectangle; and
      a streaming media processing module configured to, at least, receive the transform coefficient class specification from the transform coefficient bounding module and reduce media stream processing effort based on the transform coefficient class specification, wherein the media stream processing effort is reduced proportionally by a ratio of a size of the bounding rectangle to a size of the processing block.

2. The system of claim 1, wherein the Fourier-related transform comprises a discrete cosine transform.

3. The system of claim 1, wherein the media stream comprises a video stream.

4. The system of claim 1, wherein reducing the media stream processing effort comprises the streaming media processing module being further configured, based on the bounding rectangle, to process at least one transform coefficient within the bounding rectangle and not process the transform coefficients that are outside of the bounding rectangle.

5. The system of claim 1, wherein each bounding rectangle specification comprises:
   a first parameter corresponding to a height of the specified bounding rectangle; and
   a second parameter corresponding to a width of the specified bounding rectangle.

6. The system of claim 1, wherein each transform coefficient class corresponds to one bounding rectangle specification.

7. The system of claim 1, wherein reducing media stream processing effort based on the transform coefficient class specification comprises processing members of the at least one transform coefficient class differently from non-members.

8. The system of claim 1, wherein:
   the transform coefficient class specification includes a specification of an empty transform coefficient class; and
   reducing media stream processing effort based on the transform coefficient class specification comprises bypassing at least one processing step in response to the empty transform coefficient class.

9. The system of claim 1, wherein the streaming media processing module comprises an inverse transform module configured to, at least, perform an inverse of the Fourier-related transform.

10. The system of claim 1, wherein the streaming media processing module comprises an entropy encoding module configured to, at least, increase an entropy of the media stream in response to the transform coefficient class specification instead of calculating the entropy increased media stream from the set of transform coefficients.

11. The system of claim 1, further comprising a quantization module configured to, at least, quantize the plurality of transform coefficients before the transform coefficient bounding module determines the transform coefficient class specification.

12. A computer-implemented method for streaming media processing, the method comprising:
performing, by a computing device, a Fourier-related transform on a processing block of a media stream, the transformed processing block comprising a plurality of transform coefficients;
determining a transform coefficient class specification specifying at least one transform coefficient class among a set of transform coefficients corresponding to the plurality of transform coefficients, wherein the transform coefficient class specification includes a bounding rectangle, the bounding rectangle being defined based in part on a cluster of non-zero valued transform coefficients of the set of transform coefficients being inside of the bounding rectangle and a remainder of the set of transform coefficients being zero valued coefficients that are outside of the bounding rectangle; and
reducing media stream processing effort based on the transform coefficient class specification.

13. The method of claim 12, wherein reducing media stream processing effort based on the transform coefficient class specification comprises processing at least one transform coefficient within the bounding rectangle specified by the transform coefficient class specification.

14. The method of claim 12, wherein reducing media stream processing effort based on the transform coefficient class specification comprises bypassing at least one processing step in response to an empty transform coefficient class specified by the transform coefficient class specification.

15. A computer-implemented method of steaming media decoding, the method comprising:
receiving, by a computing device, a processing block of a media stream;
determining a transform coefficient class specification specifying a transform coefficient class among transform coefficients of the processing block, the transform coefficient class being specified by a bounding rectangle, the bounding rectangle being defined based in part on a cluster of the transform coefficients having a non-zero value being bound by the bounding rectangle and a remainder of the transform coefficients that are zero valued being outside of the bounding rectangle; and
reducing, by the computing device, media stream decoding effort based on the transform coefficient class specification, wherein the media stream decoding effort is reduced proportionally by a ratio of a size of the bounding rectangle to a size of the processing block.

16. The method of claim 15, wherein reducing media stream processing effort based on the transform coefficient class specification comprises processing at least one transform coefficient within a bounding rectangle specified by the transform coefficient class specification.

17. The method of claim 15, wherein reducing media stream processing effort based on the transform coefficient class specification comprises bypassing at least one processing step in response to an empty transform coefficient class specified by the transform coefficient class specification.

* * * * *